Aug. 16, 1966　　　　C. OAKLEY　　　　3,266,411
QUICK-COFFEE MAKER

Filed April 15, 1964　　　　　　　　　　2 Sheets-Sheet 1

INVENTOR.
CAMILLE OAKLEY

BY *Alvin E. Moore*,
ATTORNEY.

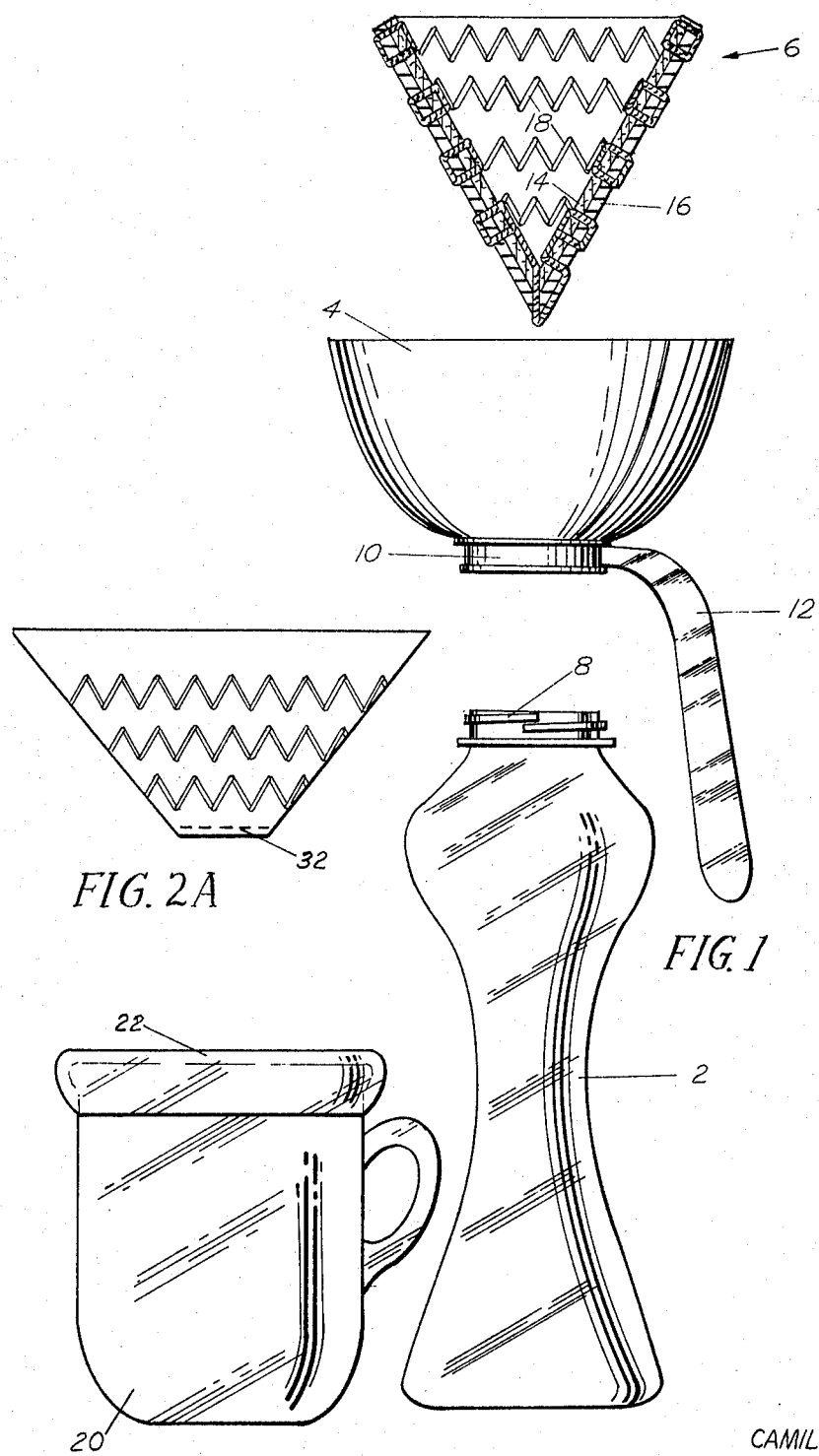

United States Patent Office 3,266,411
Patented August 16, 1966

3,266,411
QUICK-COFFEE MAKER
Camille Oakley, 416 N. Haugh Ave., Picayune, Miss.
Filed Apr. 15, 1964, Ser. No. 360,012
12 Claims. (Cl. 99—304)

This invention presents a means for quickly making hot beverages, such as coffee or tea.

In American life hot coffee is almost a universal drink at breakfast, and the preparation of breakfast is usually fast. Especially, when only a small amount of coffee, for one or two persons, is then made there is a great need for making it rapidly.

The usual way of making fresh coffee involves a somewhat complicated and time-consuming apparatus; and it frequently causes small grounds to be present in the coffee cup. Consequently, many people utilize the pre-prepared "instant" coffee, although the average person prefers the fresh flavor and aroma of the beverage freshly made from the bean.

There is also a long-felt need for a means for quickly and efficiently making tea without the use of tea bags.

In view of these facts, it is an object of the present invention to provide a device for rapidly making a small amount of fresh coffee or hot tea. Another object is to provide such a device which makes flavorful coffee or hot tea with no grounds in it. A further object is to present an efficient coffee or hot-tea filter which may be used for temporarily and insulatingly holding the hot beverage as it forms and slowly filtering it into a container, thus supplying a sediment-clean, hot drink with a controlled single flow of the beverage.

The foregoing and other objects of the invention will become more fully apparent from the following detailed description of the inventive assembly and from the accompanying drawings, in which:

FIGURE 1 is an elevational showing of the three parts of one form of the invention, the top part being shown in cross section.

FIGURE 2 is an elevational view of a sealed coffee-containing cup or mug, which is part of another form of the invention.

FIGURE 2A is an elevational view of an alternative form of the filter, especially adapted for use with the type of cup or mug that is shown in FIGURE 2.

Figure 3:
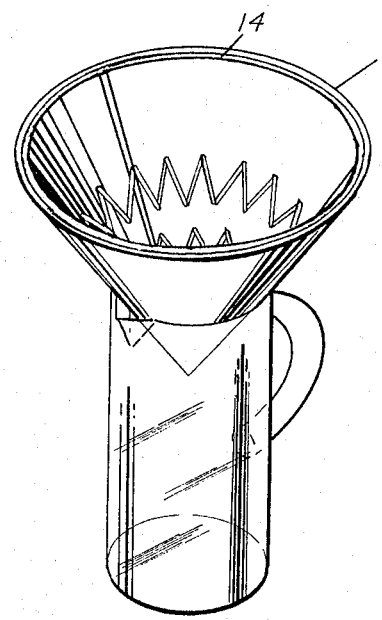
FIGURE 3 is a perspective view of a third form of the coffee or tea making apparatus.

In FIGURE 1 there are shown: a coffee or tea container, 2; a holder, 4, for the filter, coffee (or tea leaves) and hot water; and a filter, 6. Container 2 may be made of glass, other ceramic material or plastic. Preferably, it first serves as a holder for ground coffee (or tea) that is packed and sold by a manufacturer. Screw-threaded element 10, fixed to handle 12, is shown as about to be screwed tightly and sealingly down on threads 8. This element is apertured, shown in FIGURE 1 as ready for the insertion of the smaller, lower portion of filter 6, with the lower point of the funnel-like filter projecting thru 10 and into container 2.

Holder or cup 4 may be of metal, ceramics or plastics. The coffee or tea-packing plant may insert at the holder's base, just above element 10, a removable cardboard or thin metal disk, sealed over with paraffin or the like; and with the filter folded and placed inside container 2, above the coffee or tea, the assembly is sold as a unit. Alternatively, and especially after a purchaser already has a holder 4, a metal or plastics cap may be screwed on container 2, which is packed with coffee (or tea) and the filter; and these elements, minus holder 4, are sold as a unit.

Element 6 is designed as a simple but highly efficient hot-drink-forming element and filter. In FIGURE 1 it is shown as narrower in span than the brim of holder 4, but in practice it is preferably a little wider than the holder's brim, and rests on it. This element preferably is made of two sheets of material, 14 and 16, that are sewed together by stitching 18 of fibrous thread; and the resulting two-ply material is then formed into a cone, with overlapping borders at the junction line of the material. The borders then may be glued together with non-toxic, waterproof plastic and/or sewed. The inner ply 14 of this cone is of pellon, or other fibrous material; and the outer ply 16 is aluminum foil. The present inventor has discovered that aluminum foil, or tin foil, has valuable qualities in a filter for hot beverages. Firstly, it allows the hot drink to filter out of holder 4 and into container 2 only via stitches 18. These stitches of fibrous thread, which are shown in FIGURE 1 as enlarged for effective illustration, are thus a key feature of the filter; and being thus of small-diameter thread which fills the small-diameter needle holes thru the foil they allow the hot drink to filter from holder 4 at a slow rate—at a slow speed that is dependent on the size of the thread and the number of thread-filled needle holes in the foil. This slowness of filtering allows the coffee or tea in holder 4 to steep a sufficient time to make a very flavorful drink.

A second result of the aluminum foil is that it insulates the hot water and forming beverage within the filter, and keeps the drink hot while it slowly filters into container 2. This filtering is so gradual that container 2 may be made of glass of the ordinary type with no danger of its breaking because of the hot drink. The hot liquid falls so slowly into the container that the glass is slowly and safely heated.

FIGURE 2 shows the currently preferred lower part of the beverage-making assembly. The cup or mug 20 is shown as it comes from the packing plant, containing coffee, or tea, and with flexible cover 22 sealingly snapped in place over the brim of the mug. This cup preferably is substantially deeper in proportion to its height than the usual cup or mug. It may be made of plastics, ceramics or metal. After the lid and the coffee (or tea) are removed from container 20, and the filter that was packed within the ground coffee or tea leaves is removed and unfolded and placed partly within the mouth of the cup, with its larger portion resting on the cup's brim, hot water in an amount equal to about two-thirds of the total volume of the mug is poured on the proper small amount of the ground coffee, or tea leaves, that has been placed in the filter.

Figure 6:
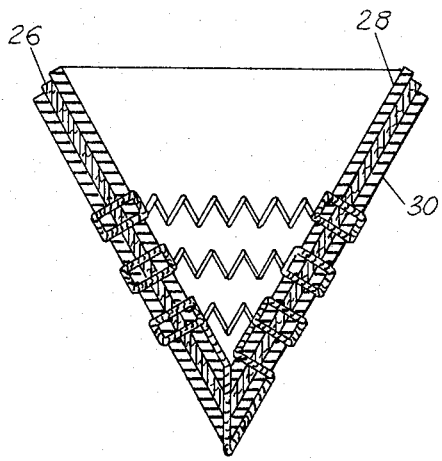
FIGURE 6 is a sectional, detail view of an alternative type of the filter.
Figure 5:
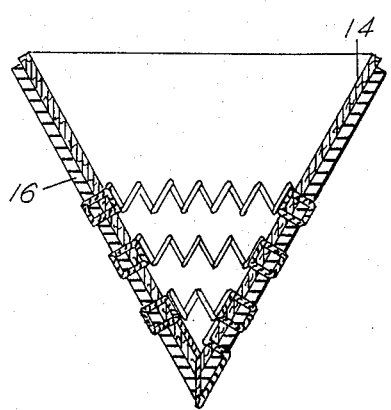
FIGURE 5 is a sectional, detail view of the currently preferred form of the filter.

The filter that is used with this relatively deep cup is of the general type shown in FIGURE 2A, FIGURE 5 or FIGURE 6. It preferably has a transverse, horizontal span that is considerably larger than its depth, so that its lower part dips only slightly into the final beverage, that is below most of the filter, in the bottom of the cup. When in operable position its stitching is below the cup's brim, and its upper part serves in lieu of holder 4 of FIGURE 1, holding the hot beverage, insulated, until it slowly drains into the cup.

Figure 4:
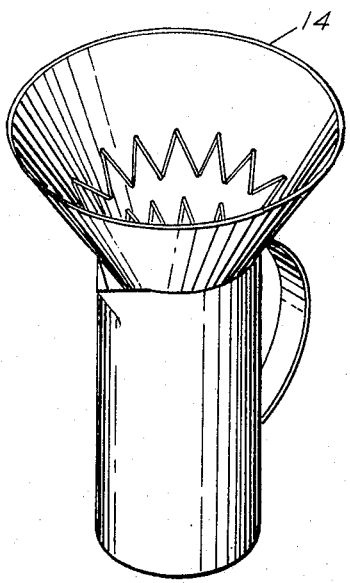
FIGURE 4 is a perspective view of a fourth form of the invention.

The filter of FIGURE 5 is conical and made in the manner of that of FIGURE 1, except that the upward extent of the stitching terminates at a level that is considerably below the upper plane or mouth of the filter. This relatively wide-mouthed type of filter may be successfully used with a narrow-mouthed container, as indicated in FIGURE 4, if the hot water is not dumped quickly into the filter, but is gradually poured into it. But preferably this type of filter is used either with a funnel, such as 4 of FIGURE 1 or 24 of FIGURE 3, or is used without a funnel, in a relatively wide-mouthed container, such as a broadmouthed jar or pitcher, or mug 20 of FIGURE 2. In this last-named, preferred use the upper level of the stitching falls below the brim of the container, so that hot water may be poured fast on the ground coffee or tea at the base of the filter and temporary holder of the liquid, with no danger of leakage down the side of the container. In this use the filter is large enough, and the apex angle of its cone is sufficiently blunt or obtuse, to hold above the bottom of the container nearly all the hot water that is poured into the temporary holder until it filters out.

The three-ply filter and temporary liquid holder shown in FIGURE 6 provides more insulation against loss of heat from the liquid than is obtained by the two-ply form. In this figure, the middle ply, 26, is of pellon or other fiber; and the two outer plies, 28 and 30, are of aluminum foil. This form also provides extra strength for holding the part of the liquid that is temporarily above the mouth of the container; but extra strength may also be obtained in the form of FIGURE 5 by using a thicker foil.

FIGURE 2A shows a filter that is especially adapted for use in a mug or cup, in making one cup of coffee or tea at a time. The lower part of this filter's cone is cut off in a plane, truncating the cone. Then an extra, round piece of the filter material may be sewed or otherwise fixed to the upper part of the filter at the plane of the cut. Alternatively, the filter is folded at its bottom, and its bottom two edges are sewed tightly together, as shown at 32. As indicated, when the filter and liquid holder is inserted into the mug of FIGURE 2, the top of the stitching is below the rim of the cup.

The invention comprehends various obvious changes in structure, within the scope of the subjoined claims. For example, with some loss of insulation, the filter and liquid holder may be made of one or two plies of the foil, eliminating the fibrous ply, with the filtering stitches extending thru the metal of the foil.

The following invention is claimed:

1. A filter and liquid holder, adapted to fit within and be supported by the mouth of a container and to be used in making and filtering hot beverages comprising: a sheet of metallic foil, having a generally funnel-like shape and a lower portion of a maxium width that is substantially less than the width of an upper portion; and threads of filtering fibrous material extending thru and closely contacting the walls of spaced holes in said sheet, from the inside to the outside of said filter and liquid holder, said sheet being imperforate except for its portions that are penetrated by said threads.

2. A device as set forth in claim 1, in which said foil is of heat-reflecting metal, and in which said device further comprises an inner sheet of porous material, shaped similarly to and closely fitting within said first-named, outer sheet, said threads of filtering fibrous material extending thru both sheets from the inside to the outside of said holder, said outer sheet covering the exterior surface of said inner sheet and being imperforate except for its portions that are penetrated by said threads.

3. A device as set forth in claim 2, in which said threads are in said lower portion.

4. A hot-beverage filter and temporary liquid holder comprising: an inner ply of fibrous, pervious material, an outer ply of thin, non-porous material, and threads of filtering fibrous material extending thru said plies and fastening them together, and extending to the outside of said non-porous material; said outer ply covering the exterior surface of said inner ply and being imperforate except for its portions that are penetrated by said threads; said filter and holder being generally cup-like in shape and having a relatively narrow lower portion, closed at its bottom.

5. A device as set forth in claim 4, in which said non-porous material is aluminum.

6. A device as set forth in claim 4, in which said filter and liquid holder is conical.

7. A device for making hot beverages comprising: a container having a mouth; a funnel removably supported by the container, with the narrow part of the funnel in direct communication with the interior of said container; and a filter having a generally funnel-like shape and a relatively narrow, closed lower end, removably supported within said funnel, and comprising an inner ply of fibrous, pervious material, an outer ply of thin, nonporous material, and threads of filtering fibrous material extending thru said plies and fastening them together; said outer ply covering the exterior surface of said inner ply and being imperforate except for its portions that are penetrated by said threads; said filter being thus adapted to continually hold a small amount of hot-beverage-forming material out of contact with the container, and to temporarily hold and slowly filter a mixture of said material and hot water.

8. A device as set forth in claim 7, in which said non-porous material is aluminum foil.

9. A device as set forth in claim 8, in which said funnel has a fastening element to removably attach it to the upper part of said container.

10. A device as set forth in claim 8, in which said container and funnel have coacting screw threads.

11. A device as set forth in claim 9, in which said funnel comprises a handle, by means of which said funnel and container may be elevated for pouring out the hot beverage.

12. A device as set forth in claim 7, in which said container is a cup, having a depth that is greater than its largest transverse span.

References Cited by the Examiner

UNITED STATES PATENTS

| | | | |
|---|---|---|---|
| 336,799 | 2/1886 | Derham | 210—489 |
| 1,576,734 | 3/1926 | Fessenden. | |
| 2,778,739 | 1/1957 | Rodth | 99—295 X |
| 2,859,878 | 11/1958 | Spiselman. | |
| 2,936,695 | 5/1960 | Donot | 99—304 X |
| 2,968,560 | 1/1961 | Goros. | |
| 3,199,682 | 8/1965 | Scholtz | 99—295 X |

FOREIGN PATENTS 812,235   2/1936   France.

WALTER A. SCHEEL, *Primary Examiner.*

S. P. FISHER, *Assistant Examiner.*